(12) United States Patent
Tokunaga et al.

(10) Patent No.: US 11,106,426 B2
(45) Date of Patent: *Aug. 31, 2021

(54) VEHICLE CONVERSATION INFORMATION OUTPUT DEVICE AND CONVERSATION INFORMATION OUTPUT METHOD

(71) Applicant: KAWASAKI JUKOGYO KABUSHIKI KAISHA, Kobe (JP)

(72) Inventors: Hisato Tokunaga, Nishinomiya (JP); Kazuhiro Ichikawa, Akashi (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/604,915

(22) PCT Filed: Apr. 12, 2017

(86) PCT No.: PCT/JP2017/015012
§ 371 (c)(1),
(2) Date: Oct. 11, 2019

(87) PCT Pub. No.: WO2018/189841
PCT Pub. Date: Oct. 18, 2018

(65) Prior Publication Data
US 2020/0104096 A1    Apr. 2, 2020

(51) Int. Cl.
*G06F 3/16*    (2006.01)
*B60Q 9/00*    (2006.01)
*G07C 5/08*    (2006.01)

(52) U.S. Cl.
CPC .............. *G06F 3/167* (2013.01); *B60Q 9/00* (2013.01); *G07C 5/0808* (2013.01)

(58) Field of Classification Search
CPC .............................. G06F 3/167; G07C 5/0808
(Continued)

(56) References Cited

U.S. PATENT DOCUMENTS 6,175,772 B1    1/2001    Kamiya et al.
6,249,720 B1    6/2001    Kubota et al.
(Continued)

FOREIGN PATENT DOCUMENTS

EP    2821977 A1    1/2015
JP    H10289006 A    10/1998
(Continued)

*Primary Examiner* — Leonard Saint Cyr
(74) *Attorney, Agent, or Firm* — Alleman Hall Creasman & Tuttle LLP (57) ABSTRACT

A vehicle conversation information output device is configured to output conversation information created according to a generated pseudo-emotion and includes: an obtaining part that obtains operation information related to at least one driving operation performed by a driver of a vehicle; a determining part that determines, based on the operation information obtained by the obtaining part, an operation level for the at least one driving operation performed by the driver, the operation level corresponding to the difficulty of the at least one driving operation; a generating part that generates a pseudo-emotion based on the operation level determined by the determining part; a creating part that creates conversation information to be output to the driver based on the pseudo-emotion generated by the generating part; and an outputting part that outputs the conversation information created by the creating part.

11 Claims, 2 Drawing Sheets

(58) Field of Classification Search
USPC .................................................. 704/270–275
See application file for complete search history.

(56) References Cited

U.S. PATENT DOCUMENTS

| | | | |
|---|---|---|---|
| 2003/0060937 | A1 | 3/2003 | Shinada et al. |
| 2008/0319602 | A1 | 12/2008 | McClellan et al. |
| 2010/0017236 | A1 | 1/2010 | Duddle et al. |
| 2012/0209474 | A1 | 8/2012 | Morris |
| 2013/0054090 | A1* | 2/2013 | Shin ................ B60K 28/06 701/36 |
| 2014/0125474 | A1 | 5/2014 | Gunaratne |
| 2015/0160020 | A1 | 6/2015 | van Hemert et al. |
| 2016/0246298 | A1* | 8/2016 | Sato ................. B60W 40/08 |
| 2017/0015318 | A1 | 1/2017 | Scofield et al. |
| 2017/0043782 | A1 | 2/2017 | Farrell et al. |
| 2017/0061798 | A1 | 3/2017 | Linder et al. |
| 2017/0315550 | A1* | 11/2017 | Ichikawa ......... B60W 60/0051 |
| 2018/0143639 | A1* | 5/2018 | Singhal ............. G01C 21/3682 |
| 2018/0314266 | A1* | 11/2018 | Shalev-Shwartz .............. G01C 21/3602 |
| 2019/0039618 | A1* | 2/2019 | Mori ................. B60W 10/20 |
| 2019/0276036 | A1* | 9/2019 | Noguchi ............ B60W 40/02 |
| 2020/0104096 | A1* | 4/2020 | To Kun Aga ......... B60R 16/02 |

FOREIGN PATENT DOCUMENTS

| | | |
|---|---|---|
| JP | H1183683 A | 3/1999 |
| JP | H11259271 A | 9/1999 |
| JP | H11259446 A | 9/1999 |
| JP | H11305862 A | 11/1999 |
| JP | 2002071379 A | 3/2002 |
| JP | 2002304362 A | 10/2002 |
| JP | 200372488 A | 3/2003 |
| JP | 2005291030 A | 10/2005 |
| JP | 2006233870 A | 9/2006 |
| JP | 2007263242 A | 10/2007 |
| JP | 2013169873 A | 9/2013 |
| JP | 2014031050 A | 2/2014 |
| JP | 2016095572 A | 5/2016 |
| WO | 2013128919 A1 | 9/2013 |

* cited by examiner

VEHICLE CONVERSATION INFORMATION OUTPUT DEVICE AND CONVERSATION INFORMATION OUTPUT METHOD

TECHNICAL FIELD

The present invention relates to a vehicle conversation information output device and conversation information output method for outputting conversation information created according to a generated pseudo-emotion.

BACKGROUND ART

Patent Literature 1 discloses a technology that gives human-like characteristics to a straddle vehicle and enables the straddle vehicle to make conversations with the user of the vehicle.

CITATION LIST

Patent Literature

Patent Literature 1: Japanese Laid-Open Patent Application Publication No. H 10-289006

SUMMARY OF INVENTION

Technical Problem

The technology disclosed in Patent Literature 1 takes into consideration the intention of the user when outputting information. However, there is a demand for increasing the variety of information to be output in a traveling state where the driver focus most of his/her attention on driving operations.

It is therefore an object of the present invention to provide a vehicle conversation information output device and a conversation information output method that enable a vehicle to output a wide variety of information.

Solution to Problem

A vehicle conversation information output device of the present invention is configured to output conversation information created according to a generated pseudo-emotion and includes: an obtaining part that obtains operation information related to at least one driving operation performed by a driver of a vehicle; a determining part that determines, based on the operation information obtained by the obtaining part, an operation level for the at least one driving operation performed by the driver, the operation level corresponding to the difficulty of the at least one driving operation; a generating part that generates a pseudo-emotion based on the operation level determined by the determining part; a creating part that creates conversation information to be output to the driver based on the pseudo-emotion generated by the generating part; and an outputting part that outputs the conversation information created by the creating part.

According to the present invention, the conversation information to be output varies based on the operation level which corresponds to the difficulty of the driving operation. Thus, the conversation information can be varied according to the difficulty of the driving operation performed by the driver, and the variety of the contents of the conversation information can be increased. Further, since a pseudo-emotion is generated based on the difficulty of the driving operation, the pseudo-emotion to be generated can be varied, for example, according to the difficulty. This enables the vehicle to behave as if it had emotions. Namely, human-like characteristics can be imparted to the vehicle.

In the present invention, the determining part may determine the operation level according to the number of types of the driving operation performed during a predetermined period of time, the number of types being obtained by the obtaining part.

With the above configuration, the conversation information to be output varies depending on the variety of types of driving operations performed within a predetermined period of time. Thus, since the types of driving operations performed within a predetermined period of time are taken into account as a factor in determining the operation difficulty, the variety of the conversation information can easily be increased.

In the present invention, the obtaining part may obtain the operation information including a degree of change of the driving operation, and the determining part may determine the operation level according to the degree of change obtained by the obtaining part.

With the above configuration, the conversation information to be output varies depending on the degree of change of the driving operation. Thus, since the degree of change of the driving operation is taken into account as a factor in determining the difficulty of the driving operation, the variety of the conversation information can easily be increased.

In the present invention, the determining part may determine the operation level based on a weighting factor and the operation information obtained by the obtaining part, the weighting factor being predetermined according to the type of the driving operation and the degree of change of the driving operation.

With the above configuration, the conversation information to be output varies depending on both the type and the degree of change of the driving operation and, additionally, the weighting is made according to the type and the degree of change of the driving operation. Thus, the variety of the conversation information can be made wider than when the conversation information is merely changed according to the type and the degree of change of the driving operation.

In the present invention, the obtaining part may obtain the operation information related to the driving operation that affects the behavior of a vehicle body of the vehicle during travel of the vehicle.

With the above configuration, the conversation information to be output varies in response to operations which affect the behavior of the vehicle body. Thus, since the operation difficulty is determined based on operations which affect the behavior of the vehicle body, the variety of the conversation information can easily be increased.

In the present invention, the determining part may determine the operation level based on the operation information obtained by the obtaining part and operation information previously obtained.

With the above configuration, the conversation information to be output varies depending on the obtained operation information (i.e., the current operation information) and operation information previously obtained (i.e., the previous operation information). Thus, since the previous operation information is taken into account as a factor in determining the driving operation difficulty, the variety of the conversation information can more easily be increased than when the conversation information is changed only according to the current operation information.

A vehicle conversation information output device of the present invention is configured to output conversation information to a driver driving a vehicle, the conversation information being created according to a generated pseudo-emotion. The device includes: a receiving part that receives an operation level for at least one driving operation performed by the driver, the operation level corresponding to the difficulty of the at least one operation and being determined based on operation information related to the at least one driving operation; a generating part that generates a pseudo-emotion based on the operation level received by the receiving part; a creating part that creates conversation information to be output to the driver based on the pseudo-emotion generated by the generating part; and an outputting part that outputs the conversation information created by the creating part.

With the above configuration, the conversation information to be output varies based on the operation level which corresponds to the difficulty of the driving operation. Thus, the conversation information can be varied according to the difficulty of the driving operation performed by the driver, and the variety of the contents of the conversation information can be increased. Further, since a pseudo-emotion is generated based on the difficulty of the driving operation, the pseudo-emotion to be generated can be varied, for example, according to the difficulty. This enables the vehicle to behave as if it had emotions. Namely, human-like characteristics can be imparted to the vehicle.

A conversation information output method of the present invention is a method for outputting conversation information to a driver driving a vehicle, the method including: obtaining operation information related to at least one driving operation performed by the driver; making determination of at least one of an operation level and a motion level based on the obtained operation information, the operation level corresponding to the difficulty of the at least one driving operation performed by the driver, the motion level corresponding to the difficulty of at least one vehicle motion exhibited by the vehicle; and outputting conversation information to the driver based on the determined at least one level.

With the above configuration, the conversation information to be output varies based on at least one of the operation level corresponding to the difficulty of the driving operation and the motion level corresponding to the difficulty of the vehicle motion. Thus, the conversation information can be varied according to the difficulty of the driving operation performed by the driver and the difficulty of the vehicle motion, and the variety of the contents of the conversation information can be increased.

Advantageous Effects of Invention

The present invention enables a vehicle to output a wide variety of information.

DESCRIPTION OF EMBODIMENTS

Hereinafter, a conversation information output device 13 according to an embodiment of the present invention will be described with reference to the drawings. The conversation information output device 13 described below is merely an embodiment of the present invention. Thus, the present invention is not limited to the embodiment, and an element may be added, omitted, or modified without departing from the gist of the invention.

Some vehicles, including straddle vehicles such as motorcycles and all terrain vehicles (ATVs), are endowed with human-like characteristics, which allow the driver of such a vehicle to feel as if he/she had a conversation with the vehicle. In the present embodiment, a conversation information output system 1 is employed in a motorcycle 2 shown in FIG. 1 to provide such a feeling. Hereinafter, the conversation information output system 1 will be described.

<Conversation Information Output System>

Figure 1:
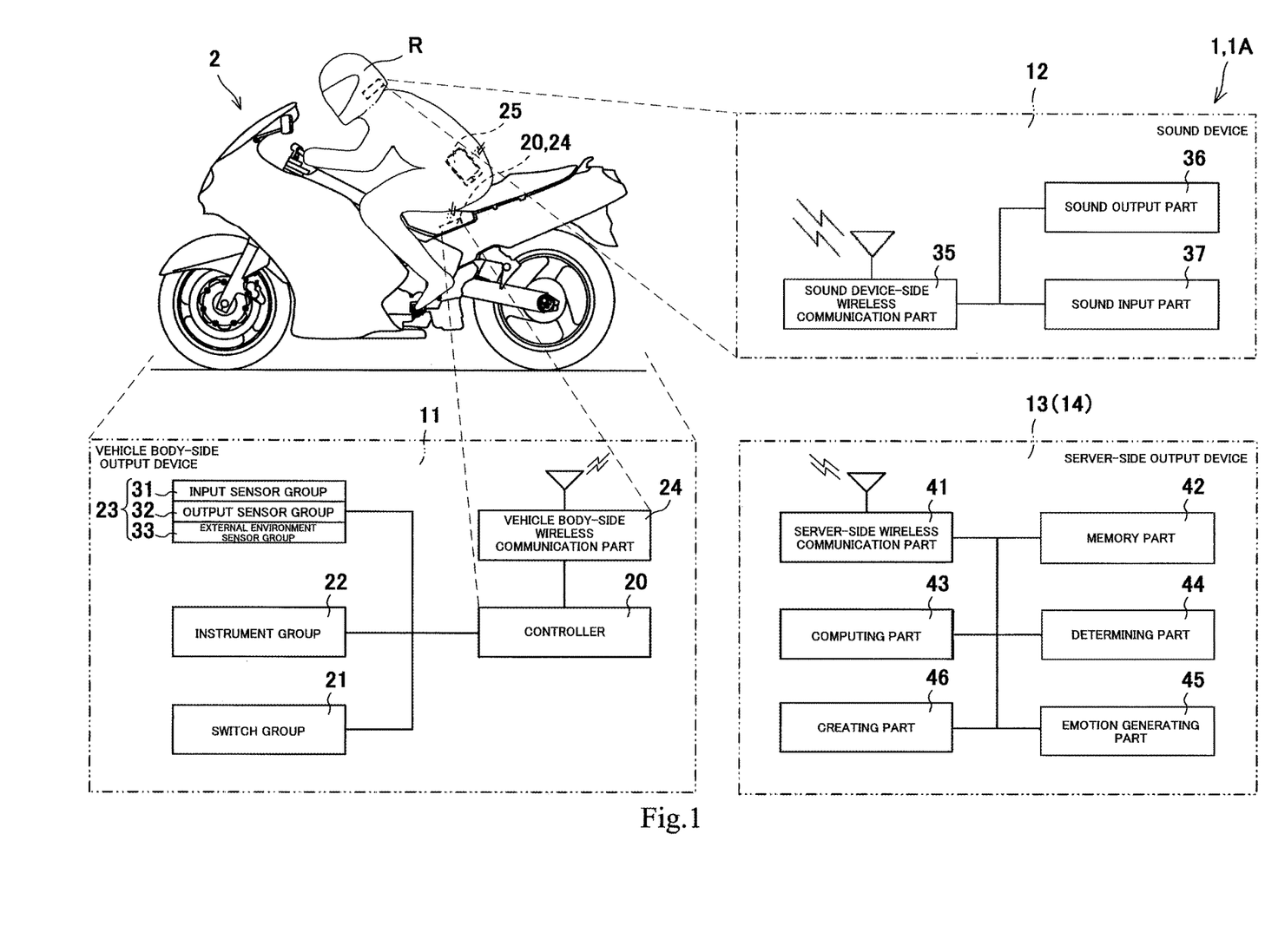
FIG. 1 is a block diagram showing the configuration of a conversation information output system including a conversation information output device according to an embodiment of the present invention.

The conversation information output system 1 is configured to generate pseudo-emotions resembling emotions which are possessed by humans and allow the driver R to feel as if the vehicle outputted conversation information based on the emotions. The conversation information output system 1 is also configured to respond to information input by the driver R in response to the conversation information output by the conversation information output system 1. Thus, the conversation information output system 1 is configured to, as stated above, allow the driver R to feel as if he/she had a conversation with the motorcycle 2. The conversation information output system 1 having these functions includes a vehicle body-side output device 11, a sound device 12, and a conversation information output device 13. The vehicle body-side output device 11 is installed in the vehicle body of the motorcycle 2, and the sound device 12 is mounted, for example, in a helmet worn by the driver R. The conversation information output device 13 is implemented by a server remote from the motorcycle 2, such as by a cloud server 14. The cloud server 14 is a server constructed on the cloud platform accessible by different clients via the Internet. In the conversation information output system 1 having such a configuration, the vehicle body-side output device 11, the sound device 12, and the conversation information output device 13 are configured as described below.

The vehicle body-side output device 11 includes a controller 20, a switch group 21, an instrument group 22, a vehicle sensor group 23, and a vehicle body-side wireless communication part 24. The controller 20 includes an engine ECU and a brake ECU. The engine ECU is configured to electronically control a throttle device, a fuel injector, and an igniter. The engine ECU is configured to further perform auxiliary control for cutting off fuel supply or disabling ignition, in addition to the basic electronic control. The brake ECU is configured to control the operation of the brake mechanism to prevent locking of the front and rear wheels (ABS) and is configured to control the distribution of braking forces acting on the front and rear wheels (CBS). The controller 20 need not necessarily include both the engine ECU and the brake ECU, and may include the engine ECU only. The controller 20 thus configured is electrically connected to the switch group 21, the instrument group 22, the vehicle sensor group 23, and the vehicle body-side wireless communication part 24.

The switch group 21 is constituted by a plurality of switches operable to enable and disable supply of electric power to various devices, and the plurality of switches include, for example, a winker switch, a high-low switch, a horn switch, a display-changing switch, and a main power supply switch. The winker switch is a switch for causing a winker device to blink, and the high-low switch is a switch for switching a headlamp device between a high beam mode and a low beam mode. The horn switch is a switch for actuating a horn device to emit sound, and the display-changing switch is a switch for switching the information displayed by the instrument group 22 described later. These switches are configured to output signals to the controller 20 when operated, and the controller 20 is configured to put the various devices into operation in response to the input signals.

The main power supply switch outputs either ON signal or OFF signal to the controller 20 in response to a switching operation performed on the main power supply switch. Upon receiving ON signal, the controller 20 starts to electronically control the devices as control targets. Upon receiving OFF signal, the controller 20 stops the operation of the devices as control targets. Further, the controller 20 is configured to, upon receiving ON signal, supply electric power to the instrument group 22 to activate the instrument group 22. The instrument group 22 is configured to display various information and includes, for example, a distance meter, a speed meter, a rotational speed meter, and a clock. The instrument group 22 is configured to obtain information associated with the meters (i.e., the cumulative travel distance, the speed of the vehicle body, the engine speed, and the time of day) from the controller 20 and display the obtained information. The controller 20 is connected to the vehicle sensor group 23 and configured to obtain various information from the vehicle sensor group 23.

The vehicle sensor group 23 includes an input sensor group 31, an output sensor group 32, and an external environment sensor group 33. The input sensor group 31 is configured to detect input operations made on the vehicle body through actions of the driver R. In particular, the input sensor group 31 is configured to detect the respective amounts of operations which affect the behavior of the vehicle body of the motorcycle 2. For example, the input sensor group 31 detects accelerator operation, brake operation, clutch lever operation, gear-shifting operation, steering operation, weight shift operation, and cornering operation which are performed by the driver R. Further, the input sensor group 31 is configured to, based on the detected input operation, send input operation information to the controller 20, and the controller 20 is configured to control the operation of the control target devices based on the input operation information.

More specifically, the input sensor group 31 includes, for example, a throttle opening degree sensor (TH opening degree sensor), a brake position sensor, a clutch sensor, a gear position sensor, a steering angle sensor, a strain sensor, load sensors, and a gyro sensor. The throttle opening degree sensor (TH opening degree sensor) detects the amount of accelerator operation by the driver R based on the opening degree of the throttle valve. The brake position sensor detects the amount of brake operation by the driver R based on the positions of the brake lever and brake pedal. The clutch sensor detects clutch operation by the driver R based on whether the clutch lever is operated. The gear position sensor detects gear-shifting operation by the driver R based on switching of the gear positions. The steering angle sensor detects steering operation by the driver R based on the rotation angle of the steering shaft (the steering angle of the front wheel). The strain sensor detects the amount of strain about the axis of the steering shaft to detect the steering torque. The load sensors include a load sensor provided on the front seat of the motorcycle 2, a load sensor provided on the rear seat of the motorcycle 2, and load sensors provided on the left and right steps on which the driver places his/her feet. These load sensors respectively detect the weight of the driver R, the weight of a passenger, and the weight distribution between the left and right sides of the driver R (i.e., the lateral weight shift of the driver R). The gyro sensor is configured to detect the angular accelerations, angular velocities, or angular displacements about three perpendicular axes of the vehicle body. In the present embodiment, the gyro sensor detects the roll angle, pitch angle, and yaw angle of the vehicle body. Thus, for example, the gyro sensor can detect cornering operation by the driver R.

The output sensor group 32 is configured to detect outputs provided by various devices of the vehicle body in response to input operations. For example, the output sensor group 32 detects the wheel speed and engine speed of the motorcycle 2. Further, the output sensor group 32 is configured to, based on the detected outputs, send output information to the controller 20, and the controller 20 is configured to, based on the output information, send the wheel speed and engine speed to the instrument group 22 and cause the instrument group 22 to display the wheel speed and engine speed. More specifically, the output sensor group 32 includes, for example, a wheel speed sensor and an engine speed sensor. The wheel speed sensor detects the respective rotational speeds of the front and rear wheels, i.e., the wheel speed. The engine speed sensor detects the rotational speed of the engine.

The external environment sensor group 33 is configured to detect information related to the surrounding environment of the motorcycle 2. For example, the external environment sensor group 33 detects the current location of the motorcycle 2, the temperature of the surroundings of the motorcycle 2, and the brightness (i.e., illuminance) of the surroundings of the motorcycle 2. The external environment sensor group 33 sends output information to the controller 20 based on the detected outputs. More specifically, the external environment sensor group 33 includes, for example, a GPS sensor, a temperature sensor, and an illuminance sensor. The GPS sensor detects the current location of the motorcycle 2, the temperature sensor detects the temperature of the surroundings of the motorcycle 2, and the illuminance sensor detects the brightness (i.e., illuminance) of the surroundings of the motorcycle 2.

As described above, the vehicle sensor group 23 includes a plurality of sensors, and outputs various information detected by the sensors to the controller 20. The controller 20 is configured to, based on the received various information, control the operation of the control target devices or put other devices into operation. The controller 20 is connected to the vehicle body-side wireless communication part 24. The vehicle body-side wireless communication part 24 is configured to communicate with a mobile information terminal 25 by near-field communication using a technology such as Bluetooth (registered trademark). The mobile information terminal 25 is configured to execute applications based on received information and display various information. The mobile information terminal 25 is also operable by the driver to output information. The mobile information terminal 25 is connectable to the Internet via an unillustrated base station, and serves also as a relay for connecting the vehicle body-side wireless communication part 24 to the Internet.

Thus, the vehicle body-side wireless communication part 24 can be connected to the Internet via the mobile information terminal 25 and can communicate with the conversation information output device 13 via the Internet. This allows the controller 20 to output various information (including operation information) detected by the vehicle sensor group 23 to the conversation information output device 13 via the vehicle body-side wireless communication part 24. The operation information is information related to operations performed by the driver R driving the motorcycle. In the present embodiment, the operation information is information related to operations which affect the behavior of the vehicle body of the motorcycle 2. Specifically, the operation information includes the types and amounts of operations detected by the input sensor group 31. As described later, the operation information may include the types and amounts of vehicle motions detected by the output sensor group 32 and information related to operations performed on the switch group 21. The operation information may further include information related to parameters of the surrounding environment of the motorcycle 2 which are detected by the external environment sensor group 33. The motorcycle 2 configured as describe above is assigned a unique identification number for differentiating the motorcycle 2 from other motorcycles 2, and the vehicle body-side wireless communication part 24 is configured to output the operation information with the identification number to the conversation information output device 13.

The vehicle body-side wireless communication part 24 is configured to communicate with the sound device 12 by near-field communication as mentioned above, and exchange sound information (sound signals) with the sound device 12. The sound device 12 includes a sound device-side wireless communication part 35, a sound output part 36, and a sound input part 37. The sound device-side wireless communication part 35 is configured to exchange sound information with the vehicle body-side wireless communication part 24 of the vehicle body-side output device 11. The sound device-side wireless communication part 35 is connected to the sound output part 36 and the sound input part 37. The sound output part 36 is, for example, a speaker, which is attached inside the helmet so as to be located in the vicinity of an ear of the driver R. The sound output part 36 need not necessarily be a speaker, and may be an earphone. The sound output part 36 is not necessarily limited to being of the sound emission type, and may be of the bone conduction type. The sound output part 36 is configured to receive sound information sent from the vehicle body-side wireless communication part 24 via the sound device-side wireless communication part 35 and output the sound information in the form of sound (e.g., non-verbal sound such as alarm or voice made up of natural language).

The sound input part 37 is, for example, a microphone, which is attached to the helmet so as to be located in the vicinity of the mouth of the driver R. The sound input part 37 is not limited to a microphone, and may be of the bone conduction type. The sound input part 37 collects sound emitted by the driver R. That is, the driver R can input a voice made up of natural language through the sound input part 37, and the sound input part 37 is configured to convert the input voice to sound information and send the sound information to the sound device-side wireless communication part 35. Upon receiving the sound information sent from the sound input part 37, the sound device-side wireless communication part 35 sends the sound information to the vehicle body-side wireless communication part 24 of the vehicle body-side output device 11 by near-field communication. The sent sound information is associated with the above-described identification information and transmitted together with the identification information to the conversation information output device 13 via the vehicle body-side wireless communication part 24 and the mobile information terminal 25.

The conversation information output device 13 includes a server-side wireless communication part 41 and a memory part 42. The server-side wireless communication part 41, which is an example of the outputting part, exchanges operation information with the vehicle body-side wireless communication part 24 by wireless communication. The memory part 42 stores the received operation information in association with the corresponding identification number transmitted together with the operation information. The conversation information output device 13 includes a computing part 43, and the computing part 43 computes the degree of change of a driving operation based on the received operation information stored in the memory part 42. In the present embodiment, the degree of change is, for example, the time rate of change of the amount of an input operation, and examples of the time rate of change include the time rates of change of the amount of accelerator operation, the amount of brake operation, the rotation angle of the steering shaft, the weight shift of the driver R, the roll angle, the pitch angle, and the yaw angle. The computed degree of change of the driving operation is stored in the memory part 42 and used by a determining part 44.

The determining part 44 determines the operation level for a driving operation performed by the driver R, and makes the determination based on the operation information and the degree of change which are stored in the memory part 42. The operation level is a level set according to the difficulty of the driving operation performed by the driver R. The function of the determining part 44 will now be described in more detail. For example, when determining the operation level, the determining part 44 counts the number of types of driving operations performed by the driver R during a predetermined period of time (e.g., about 1 second to 5 seconds). The determining part 44 performs this counting based on the operation information stored in the memory part 42. Further, the determining part 44 obtains from the memory part 42 the time rates of change of the respective amounts of the driving operations performed during the predetermined period of time. In the memory part 42, additional values for the operation level are set for each driving operation in association with the time rate of change of the amount of the driving operation.

TABLE 1

| | | Operations performed by driver | | | |
|---|---|---|---|---|---|
| | | Accelerator operation | Brake operation | Steering operation | Weight shift |
| Additional values for operation level | 0 | Amount of operation: Zero | Amount of operation: Zero | Amount of operation: Zero | Amount of weight shift: Zero |
| | 1 | Amount of operation: Constant | Amount of operation: Constant | Amount of operation: Constant | Amount of weight shift: Constant |
| | 2 | Amount of operation: Changed | Amount of operation: Changed | Amount of operation: Changed | Amount of weight shift: Changed |
| Weighting factor | | 1.1 | 1.1 | Changed 1.2 Zero or Constant 1.3 | Changed 1.2 Zero or Constant 1.3 |

As to the accelerator operation, for example, when the time rate of change of the amount of operation is zero, namely when the amount of operation is constant, the additional value for the operation level is +1 as shown in Table 1. When the time rate of change of the amount of operation is not zero, namely when the amount of operation is changed, the additional value for the operation level is +2. As to the brake operation, when the time rate of change of the amount of operation is zero, namely when the amount of operation is constant, the additional value for the operation level is +1. When the time rate of change of the amount of operation is not zero, namely when the amount of operation is changed, the additional value for the operation level is +2. As to the steering operation, when the time rate of change of the amount of operation, in particular the time rate of change of the steering torque is zero, the additional value for the operation level is +1. When the time rate of change of the steering torque is not zero, namely when the amount of operation is changed, the additional value for the operation level is +2. Further, as to the weight shift operation performed by the driver R, when the amount of operation is zero, the additional value for the operation level is +1, while when the amount of operation is changed, the additional value for the operation level is +2. As to the clutch lever operation and gear-shifting operation, the additional value for the operation level is set to +1 when these operations are performed.

In the memory part 42, weighting factors for the additional values are set for each input operation according to the time rate of change of the amount of operation. For example, for the clutch lever operation and gear-shifting operation, the weighting factor is 1. For the accelerator operation and brake operation, the weighting factor is 1.1 irrespective of the amount of operation. For the steering operation and weight shift operation, the weighting factor is 1.2 when the time rate of change is zero, and the weighting factor is 1.3 when the time rate of change is not zero. The determining part 44 makes determination based on the additional values and weighting factors which are set as described above; specifically, the determining part 44 multiplies the additional value by the weighting factor for each of the driving operations performed during a predetermined period of time and calculates the sum of the multiplied additional values. The determining part 44 determines the thus calculated sum of the additional values as the operation level. In this manner, the determining part 44 can determine the operation level for at least one driving operation performed during a predetermined period of time.

The memory part 42 further stores operation information related to driving operations performed by the driver R in the past, and the determining part 44 determines the operation level based on the current operation information (i.e., the latest operation information) and the previous operation information. Specifically, when determining the operation level, the determining part 44 compares the current operation information and the previous operation information, and determines whether information identical to the current operation information has been repeatedly obtained in the past. Upon determining that information identical to the current operation information has been repeatedly obtained, the determining part 44 assumes that the difficulty of the driving operation for the driver R has decreased and reduces the operation level by multiplying the operation level by a coefficient ($\leq 1$) determined according to the number of times at which the information has been obtained. The operation level is determined at predetermined time intervals and stored into the memory part 42. The determined operation level is used by an emotion generating part 45.

In the conversation information output device 13, as described above, the determining part 44 determines the operation level for driving operations performed by the driver R, based on the operation information received by the server-side wireless communication part 41 and stored in the memory part 42. The conversation information output device 13 is configured to give human-like characteristics to the motorcycle 2 by generating a pseudo-emotion based on the operation level and create conversation information based on the pseudo-emotion. That is, the conversation information output device 13 is configured to allow the driver R to feel as if the motorcycle 2 had emotions like humans and made conversations according to the emotions. The pseudo-emotion of the motorcycle 2 is, for example, one of eight basic emotions of humans (delight, trust, anxiety, surprise, sadness, dislike, anger, and anticipation) or one of eight complex emotions (optimism, love, deference, awe, disappointment, remorse, contempt, and aggression) each composed of two of the basic emotions. The pseudo-emotion influences the determination of the contents, tone, and frequency of conversations with the driver R, just as the emotion of a person affects his/her conversations with another person. The pseudo-emotion changes every time the driver R gets on and off the motorcycle 2 and also changes during travel depending on driving operations performed by the driver R (i.e., the pseudo-emotion changes every time the operation level is determined). Thus, a pseudo-emotion matching the intention of the driver is generated, and this allows the driver R to feel as if the motorcycle 2 were a living creature (or a human at an intuitive level). The conversation information output device 13 having such a function further includes an emotion generating part 45 and a creating part 46.

The emotion generating part 45 generates a pseudo-emotion of the motorcycle 2 according to the operation level determined by the determining part 44. For example, when the operation level is high, the emotion generating part 45 selects "optimism" as the pseudo-emotion, while when the operation level is low, the emotion generating part 45 selects "trust" as the pseudo-emotion. When the operation level remains high for a predetermined period of time, the emotion generating part 45 changes the pseudo-emotion from "optimism" to "aggression", while when the operation level remains low for a predetermined period of time, the emotion generating part 45 changes the pseudo-emotion from "trust" to "deference". In this manner, the emotion generating part 45 generates a pseudo-emotion based on driving operations performed by the driver R, and the pseudo-emotion generated is stored into the memory part 42 in association with the identification number of the motorcycle 2. The pseudo-emotion thus stored is continually updated and changed in the memory part 42. As described above, the continually changing pseudo-emotion influences the contents, tone, and frequency of conversations made based on conversation information. The creating part 46 creates conversation information based on the pseudo-emotion to establish communication with the driver R.

More specifically, the creating part 46 is implemented by execution of an information processing system such as neural network, expert system, or random forest. The creating part 46 learns in advance what was said by various people (e.g., famous people), together with the emotions expressed by the people. Thus, upon input of a pseudo-emotion to the creating part 46, the creating part 46 creates conversation information (i.e., the contents and tone of conversation) according to the pseudo-emotion. When the pseudo-emotion is "optimism", conversation information incorporating the contents and tone reflecting the emotion of optimism is created, and when the pseudo-emotion is "aggression", conversation information incorporating the contents and tone reflecting the emotion of aggression is created. Further, the creating part 46 varies the frequency and timing of conversation information creation according to the pseudo-emotion. The creating part 46 may be configured to create conversation information predetermined for different pseudo-emotions to be generated, without executing the information process as described above.

The creating part 46 creates, as conversation information, sound information to be output through the sound output part 36 of the sound device 12 in the form of a voice made up of natural language. Specifically, the creating part 46 converts conversation information from text data to sound information by a voice synthesis software that converts text data to analog voice signals (examples of the software include ViaVoice [registered trademark] of IBM [registered trademark] and FineSpeech [registered trademark] of Fujitsu Limited [registered trademark]). The created sound information is sent from the creating part 46 to the server-side wireless communication part 41 and then wirelessly transmitted to the sound device 12 via the mobile information terminal 25 and the vehicle body-side wireless communication part 24. The sound device 12 obtains the conversation information by the sound device-side wireless communication part 35 and outputs the natural language voice from the sound output part 36. Thus, the conversation information is delivered to the driver R in the form of a voice. It is not necessary that the entire text included in the conversation information be converted to sound information. The main contents, in particular driving-related contents, of the information may be converted from text data to sound information and delivered to the driver R in the form of a voice.

The sound device 12 allows the driver R to vocally input his/her requests or answers to conversation information through the sound input part 37. The input sound information is wirelessly transmitted to the conversation information output device 13 via the sound device-side wireless communication part 35, the vehicle body-side wireless communication part 24, and the mobile information terminal 25. In the conversation information output device 13, the server-side wireless communication part 41 obtains the sound information, and the creating part 46 converts the sound information to text data by means such as the software as mentioned above. Subsequently, the creating part 46 creates new conversation information based on the text data and the stored pseudo-emotion. The new conversation information is then wirelessly transmitted to the sound device 12 from the conversation information output device 13 via the mobile information terminal 25 and the vehicle body-side wireless communication part 24. The sound device 12 delivers the new conversation information in the form of sound information to the driver R. This enables the driver R to feel as if the motorcycle 2 were a living creature having emotions.

Figure 2:
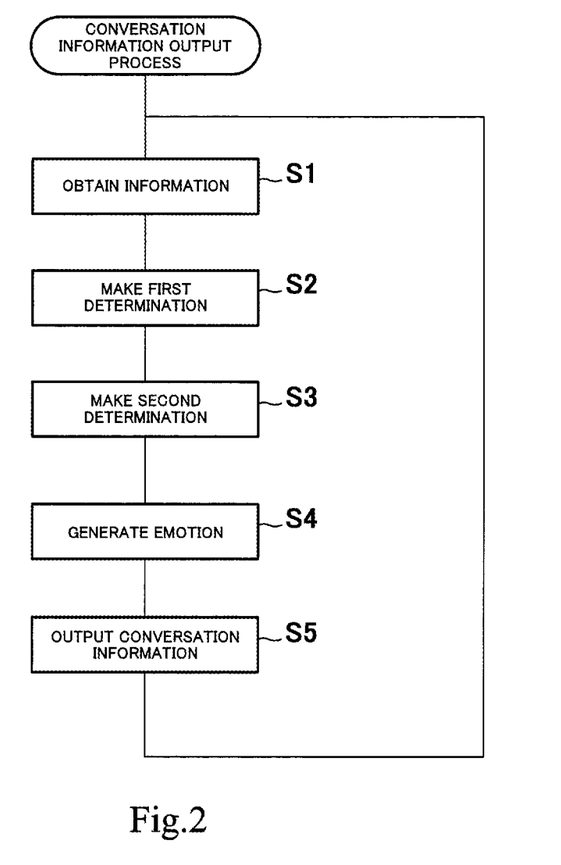
FIG. 2 is a flowchart illustrating the steps of an information output process executed by the information output device.

Hereinafter, the procedure (information output process) of creating conversation information based on the pseudo-emotion set in the conversation information output device 13 and outputting the conversation information in the form of a natural language voice from the sound output part 36 of the sound device 12 will be described with reference to the flowchart of FIG. 2. First, once the main power supply switch of the motorcycle 2 is operated, ON signal is output from the main power supply switch, and the conversation information output device 13 receives the notification of output of ON signal, together with the identification information, via the vehicle body-side wireless communication part 24. Thus, the conversation information output process starts and proceeds to step S1.

At step S1, which is an information obtaining step, operation information related to driving operations performed by the driver R is obtained. Specifically, in the vehicle body-side output device 11, various information detected by the sensors included in the input sensor group 31, the output sensor group 32, and the external environment sensor group 33 are input to the controller 20. The controller 20 transmits the detected various information along with the identification information of the motorcycle 2 to the conversation information output device 13. This transmission is executed at predetermined time intervals. In the conversation information output device 13, the memory part 42 stores the transmitted various information. The computing part 43 computes the degree of change of each driving operation based on the operation information included in the stored information, and stores the computed degree of change into the memory part 42. Once the operation information and the degree of change are stored in the memory part 42, the process proceeds to step S2.

At step S2, which is a first determination step, the determining part 44 determines the operation level based on the operation information and the degree of change which are stored in the memory part 42. The following will describe the determination performed by the determining part 44 in an example where accelerator operation is performed in such a manner as to gradually increase the amount of operation while steering operation is simultaneously performed in such a manner as to apply a constant steering torque and where clutch lever operation and gear-shifting operation are performed after the accelerator operation and steering operation and within a predetermined period of time. For the accelerator operation performed in such a manner as to gradually increase the amount of operation, the additional value is +2 and the weighting factor is 1.1, while for the steering operation performed in such a manner as to apply a constant steering torque, the additional value is +1 and the weighting factor is 1.2. Accordingly, the operation level of the simultaneous operations is 3.4. Since the clutch lever operation and gear-shifting operation, for both of which the additional value is +1, are further performed within the predetermined period of time, +2 is added to the operation level. As a result, the operation level during the predetermined period of time is determined to be 5.4. In this manner, the operation level is determined by multiplying the additional value by the weighting factor for each of the driving operations performed within the predetermined period of time and determining the sum of the multiplied values. The operation level thus determined is stored in the memory part 42, and then the process proceeds to step S3.

At step S3, which is a second determination step, the determining part 44 compares the previous operation information stored in the memory part 42 and the currently obtained operation information, and multiplies the operation level by a coefficient based on the number of times at which information identical to the current operation information has been obtained. In the present embodiment, the coefficient is set to 1 according to the number of times at which information identical to the current operation information has been obtained, and the operation level is kept at 5.4. After the operation level is multiplied by the coefficient and the multiplied value is stored as the operation level in the memory part 42, the process proceeds to step S4.

At step S4, which is an emotion generating step, the emotion generating part 45 generates a pseudo-emotion of the motorcycle 2 based on the determined operation level stored in the memory part 42. Specifically, the emotion generating part 45 selects one of the eight basic emotions and eight complex emotions according to the operation level stored in the memory part 42 and defines the selected emotion as the pseudo-emotion of the motorcycle 2. For example, when the operation level is 5.4, "optimism" is selected as the pseudo-emotion due to the high operation level. After this selection, the current pseudo-emotion is updated into "optimism" and stored in the memory part 42. The pseudo-emotion of the motorcycle 2 is generated in this manner, and the process proceeds to step S5.

At step S5, which is a conversation information output step, the creating part 46 creates conversation information by executing an information process system such as neural network based on the current pseudo-emotion stored in the memory part 42 and sound information input through the sound input part 37 of the sound device 12. The created conversation information is sent to the sound device 12 from the conversation information output device 13 via the mobile information terminal 25 and the vehicle body-side wireless communication part 24 at a timing determined by the creating part 46 according to the current pseudo-emotion stored in the memory part 42. The conversation information is output from the sound output part 36 to the driver R in the form of sound information. After a lapse of a predetermined time from the output of the sound information to the driver R, the process returns to step S1.

After returning to step S1, the process proceeds from step S1 to step S4 in order as described above. At step S4, if it is determined that the emotion generating part 45 has generated the same pseudo-emotion at a predetermined number of consecutive times, the emotion generating part 45 generates a different pseudo-emotion. For example, when "optimism" is repeatedly selected as the pseudo-emotion as in the above case, the pseudo-emotion is changed from "optimism" to "aggression". That is, the emotion of aggression is generated as the current pseudo-emotion and, at step S5, conversation information is generated based on the pseudo-emotion of aggression. As described thus far, the conversation information output process is designed to output conversation information based on the pseudo-emotion. Additionally, the conversation information output process is repeated until the main power supply switch of the motorcycle 2 is operated and the conversation information output device 13 is notified of output of OFF signal from the main power supply switch.

In the conversation information output device 13, as describe above, the conversation information to be output varies based on the operation level which corresponds to the difficulty of driving operations. Thus, the conversation information can be varied according to the difficulty of driving operations performed by the driver R, and the variety of the contents of the conversation information can be increased. Further, since a pseudo-emotion is generated based on the difficulty, the pseudo-emotion to be generated can be varied, for example, according to the difficulty. This enables the motorcycle 2 to behave as if it had emotions. Namely, human-like characteristics can be imparted to the motorcycle 2.

In the conversation information output device 13, the conversation information to be output varies depending on the types of driving operations performed within a predetermined period of time. Thus, since the types of driving operations performed within a predetermined period of time are taken into account as a factor in determining the operation difficulty, the variety of the conversation information can easily be increased. Further, in the conversation information output device 13, the conversation information to be output varies depending on the degrees of change of driving operations. Thus, since the degrees of change of driving operations are taken into account as a factor in determining the driving operation difficulty, the variety of the conversation information can easily be increased.

In the conversation information output device 13, the conversation information to be output varies depending on both the types and the degrees of change of driving operations and, additionally, the weighting is made according to the types and the degrees of change of driving operations. Thus, the variety of the conversation information can be made wider than when the conversation information is merely changed according to the types and the degrees of change of driving operations. Further, in the conversation information output device 13, the conversation information to be output varies in response to operations which affect the behavior of the vehicle body. Thus, since the operation difficulty is determined based on operations which affect the behavior of the vehicle body, the variety of the conversation information can easily be increased.

Additionally, in the conversation information output device 13, the conversation information to be output varies depending on the obtained operation information (i.e., the current operation information) and operation information previously obtained (i.e., the previous operation information). Thus, since the previous operation information is taken into account as a factor in determining the driving operation difficulty, the variety of the conversation information can more easily be increased than when the conversation information is changed only according to the current operation information.

Other Embodiments

In the conversation information output device 13 of the present embodiment, a pseudo-emotion is created according to the operation level, and conversation information is created based on the pseudo-emotion. However, the conversation information output device is not necessarily limited to such a configuration. That is, the contents of the conversation represented by conversation information, the timing of conversation information output, and the frequency of conversation information output may be varied directly based on the operation level without creation of any pseudo-emotion.

For example, when the additional value for the operation level is large, the creating part 46 may create conversation information intended to praise the operation performed by the driver, or the frequency of conversation may be reduced compared to when the additional value for the operation level is small. Further, when the additional value for the operation level is large, the information volume of conversation information may be reduced compared to when the additional value for the operation level is small, so that the driver can focus more attention on the driving. When the additional value for the operation level remains large for some time, conversation information intended to appreciate the driver's effort may be created on the assumption that the driver is tired.

When the additional value for the operation level remains small for some time, creation of conversation information may be executed so as to prevent the driver from falling into a dull state of mind in consideration of the possibility that the driver has got bored of driving. Specifically, creation of conversation information may be carried out so as to increase the frequency of conversation and the information volume of conversation information. In the case where pseudo-emotions are created, an emotion of boredom may be created when the additional value for the operation level remains small for some time. Further, conversation information acknowledging the intention of the driver may be created depending on the type of the operation and the additional value for the operation level. For example, when the driving operation is different in type from those usually performed and the additional value for the operation level is large, the creating part 46 may create conversation information the contents of which read as follows: "You are aggressive today" or "I see you are in a hurry".

In the conversation information output device 13 of the present embodiment, the operation level is unambiguously determined by the determining part 44. However, the way in which the operation level is determined may be varied for different drivers according to the years of driving experience and driving skill of the drivers and the type of the motorcycle 2. Although in the present embodiment the emotion generating part 45 selects a pseudo-emotion in one-to-one correspondence with the operation level, pseudo-emotion generation need not necessarily be performed in this manner. For example, the emotion generating part 45 is implemented by execution of an information process system such as neural network, expert system, or random forest. That is, the emotion generating part 45 may learn in advance the relationship between operation level and emotion for many people, and may generate a pseudo-emotion based on the operation level determined by the determining part 44. In this case, a pseudo-emotion matching the intention of the driver R can be generated. Additionally, since the pseudo-emotion is set to simulate the driver's emotion according to the operation level, the driver is likely to feel as if the vehicle possessed the same emotion as the driver. Thus, the driver is likely to develop empathy or affection for the vehicle.

The method by which the determining part 44 of the conversation information output device 13 of the present embodiment determines the operation level is merely an example, and the operation level may be determined by another method. For example, although in the above embodiment the operation level is determined for different operation members (such as an accelerator grip, a brake lever, a foot brake pedal, and a handle) and the values of the operation level are summed, the operation level may be determined only based on the difficulty of an operation performed on one operation member. Further, the additional value may be varied not only based on whether the amount of operation changes with time but also based on the magnitude of the time rate of change of the amount of operation. For example, when the time rate of change is high, namely when the amount of operation is rapidly changed, the additional value may be increased, while when the time rate of change is low, namely when the amount of operation is gradually changed, the additional value may be set low.

Further, the operation level may be determined with reference to information other than the operation information. Specifically, it is conceivable to determine the operation level not only based on the operation information but also based on the vehicle body behavior of the motorcycle 2. Additionally, the operation level may be set higher during cornering than during straight running, and the operation level may be set higher during travel at a high speed than during travel at a low speed. For example, the weighting factor for the operation level to be determined may be increased depending on the speed of the motorcycle. The surrounding environment of the vehicle body may be taken into consideration as information other than the operation information in determination of the operation level. In this case, for example, the operation level may be set higher in a situation where the air resistance is large, the frictional resistance of the ground surface is low, or it is raining, than in other situations. The operation level to be determined may vary depending on the state of the ground surface on which the motorcycle is traveling. Further, when operations counteracting each other (accelerator operation and brake operation) are simultaneously performed, the weighting factor may be set so as to increase the additional value for the determination level.

Additionally, in the conversation information output device 13 of the present embodiment, the operation level can be determined based on how the driver R has performed driving operations in the past and based on the experience of the driver R in driving the motorcycle 2. That is, the operation level to be determined may be varied depending on the driver R and the traveled road, and this allows generation of a wider variety of emotions. When, as described above, the operation level is determined based on the current operation information (i.e., the latest operation information) and the previous operation information, the determination of the operation level may be performed based on the deviation of the degree of change of a driving operation of interest (driving operation taken into consideration in determination of the operation level) from a previously observed tendency of the degree of change of the driving operation of interest or may be performed based on how much the degree of change of the driving operation of interest differs from an average of the previously observed degrees of change of the driving operation of interest.

The conversation information output device 13 of the present embodiment is implemented by the cloud server 14. However, the conversation information output device 13 may be mounted in the motorcycle 2. In this case, the vehicle body-side output device 11 and the conversation information output device 13 may be embodied by one electronic device or may be embodied by separate electronic devices which are connected by wire. The conversation information output device 13 may be implemented by the mobile information terminal 25. In the present embodiment, the conversation information output device 13 is responsible for determination of the operation level. Instead, the controller 20 and the mobile information terminal 25 may determine the operation level. In this case, the server-side wireless communication part 41 serves as the receiving part. Although the conversation information output device 13 of the present embodiment outputs conversation information to the driver R driving the motorcycle 2, conversation information may be output to the driver R driving a four-wheel automobile.

Further, although in the conversation information output device 13 of the present embodiment the operation level is determined mainly based on the amounts of operations which affect the behavior of the vehicle body of the motorcycle 2 (i.e., behavior-related operations), the operation level may be determined also based on operations performed on various switches of the switch group 21 (i.e., operations unrelated to the behavior of the vehicle body). In the conversation information output device 13 of the present embodiment, the operation level is determined based on the operation information related to driving operations. However, pseudo-emotions may be generated based on motion information related to motions of the motorcycle 2 which are caused by driving operations. Specifically, in this case, the conversation information output device 13 obtains motion information, including information detected by the input sensor group 31 and the output sensor group 32 (e.g., the inclination of the vehicle body, the wheel speed, and the engine speed), whether the ABS and CBS are put into operation by the brake ECU, and whether traction control is executed by the engine ECU. The obtained motion information is stored into the memory part 42. The computing part 43 computes the degree of change of motion (e.g., the acceleration, the change in the inclination of the vehicle body over time, and the time rate of change of the engine speed) based on the above motion information. As in the case of determination of the operation level, the determining part 44 determines the motion level of the motorcycle 2 based on the motion information and the degree of change of motion.

The greater the degree of change of motion is, the higher the motion level is. The motion level is incremented as motions are performed during a predetermined period of time. The motion level is related to motions of the motorcycle 2 which are caused by driving operations performed by the driver R, and is set according to the difficulty with which the motions are caused. After the additional value for the motion level is determined, a pseudo-emotion is created based on the additional value for the motion level just as a pseudo-emotion is created based on the additional value for the operation level in the conversation information output device 13 of the present embodiment. Conversation information is created based on the pseudo-emotion. A conversation information output device 1A thus configured provides the same advantageous effect as the conversation information output device 13 of the present embodiment.

REFERENCE CHARACTERS LIST

13 Conversation information output device
41 Server-side wireless communication part (receiving part)
42 Memory part (obtaining part)
44 Determining part
45 Emotion generating part
46 Creating part

The invention claimed is:

1. A vehicle conversation information output device configured to output conversation information created according to a generated pseudo-emotion, the device comprising:
an obtaining part that obtains operation information related to a degree of change of at least one driving operation performed by a driver of a vehicle during manual driving operation, the degree including a time rate of change of at least one of an amount of accelerator operation, an amount of brake operation, and a rotation angle of a steering shaft;
a determining part that determines, based on the operation information obtained by the obtaining part, an operation level for the at least one driving operation performed by the driver, the operation level corresponding to the difficulty of the at least one driving operation;
a generating part that generates a pseudo-emotion based on the operation level determined by the determining part;
a creating part that creates conversation content to be output to the driver based on the pseudo-emotion generated by the generating part; and
an outputting part that outputs the conversation content created by the creating part.

2. The vehicle conversation information output device according to claim 1, wherein the determining part determines the operation level according to the number of types of the driving operation performed during a predetermined period of time, the number of types being obtained by the obtaining part.

3. The vehicle conversation information output device according to claim 1, wherein the determining part determines the operation level based on a weighting factor and the operation information obtained by the obtaining part, the weighting factor being predetermined according to the type of the driving operation and the degree of change of the driving operation.

4. The vehicle conversation information output device according to claim 1, wherein the obtaining part obtains the operation information related to the driving operation that affects the behavior of a vehicle body of the vehicle during travel of the vehicle.

5. The vehicle conversation information output device according to claim 1, wherein the determining part determines the operation level based on the operation information obtained by the obtaining part and operation information previously obtained.

6. The vehicle conversation information output device according to claim 1, further comprising a memory part that is configured to store the pseudo-emotion generated by the generating part in association with an identification number of the vehicle.

7. The vehicle conversation information output device according to claim 1, further comprising a sound device that allows the driver to vocally input the driver's request or answer to the conversation content through the sound device.

8. A vehicle conversation information output device configured to output conversation content to a driver driving a vehicle, the conversation content being created according to a generated pseudo-emotion, the device comprising:
a receiving part that receives an operation level for a degree of change of at least one driving operation performed by the driver during manual driving operation, the operation level corresponding to the difficulty of the degree of change of the at least one operation and being determined based on operation information related to the degree of change of the at least one driving operation, the degree including a time rate of change of at least one of an amount of accelerator operation, an amount of brake operation, and a rotation angle of a steering shaft;
a generating part that generates a pseudo-emotion based on the operation level received by the receiving part;
a creating part that creates conversation content to be output to the driver based on the pseudo-emotion generated by the generating part; and
an outputting part that outputs the conversation content created by the creating part.

9. The vehicle conversation information output device according to claim 8, further comprising a memory part that is configured to store the pseudo-emotion generated by the generating part in association with an identification number of the vehicle.

10. The vehicle conversation information output device according to claim 8, further comprising a sound device that allows the driver to vocally input the driver's request or answer to the conversation content through the sound device.

11. A conversation information output method for outputting conversation content to a driver driving a vehicle, the method comprising:

obtaining operation information related to a degree of change of at least one driving operation performed by the driver during manual driving operation, the degree including a time rate of change of at least one of an amount of accelerator operation, an amount of brake operation, and a rotation angle of a steering shaft;

making determination of at least one of an operation level and a motion level based on the obtained operation information, the operation level corresponding to the difficulty of the at least one driving operation performed by the driver, the motion level corresponding to the difficulty of at least one vehicle motion exhibited by the vehicle; and outputting conversation content to the driver based on the determined at least one level.

* * * * *